United States Patent
Vernacchia et al.

(10) Patent No.: US 9,037,361 B2
(45) Date of Patent: May 19, 2015

(54) SELF ADJUSTING SHIFT CABLE ALIGNMENT FOR A TRANSMISSION RANGE CONTROL MODULE SYSTEM

(75) Inventors: Mark A. Vernacchia, Northville, MI (US); William F. Sultze, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1096 days.

(21) Appl. No.: 13/022,058

(22) Filed: Feb. 7, 2011

(65) Prior Publication Data

US 2011/0246033 A1 Oct. 6, 2011

Related U.S. Application Data

(60) Provisional application No. 61/320,851, filed on Apr. 5, 2010.

(51) Int. Cl.
*F16H 59/08* (2006.01)
*F16H 61/28* (2006.01)
*F16H 61/24* (2006.01)
*F16H 61/32* (2006.01)

(52) U.S. Cl.
CPC ...... *F16H 61/2807* (2013.01); *F16H 2061/247* (2013.01); *F16H 2061/326* (2013.01); *F16H 2061/283* (2013.01)

(58) Field of Classification Search
USPC .......................................................... 701/51
IPC .................. F16H 16/2087,2061/326, 2061/247
See application file for complete search history.

(56) References Cited

U.S. PATENT DOCUMENTS

| | | | | |
|---|---|---|---|---|
| 4,550,627 A * | 11/1985 | Lauer et al. | ................ | 74/473.25 |
| 4,663,713 A * | 5/1987 | Cornell et al. | ................... | 701/52 |
| 5,590,564 A * | 1/1997 | Kishimoto | ................ | 74/473.13 |
| 6,057,871 A * | 5/2000 | Peterson | ...................... | 347/238 |
| 6,394,021 B1 * | 5/2002 | Caron et al. | ................ | 116/28.1 |
| 6,453,766 B1 * | 9/2002 | Ose | ................ | 74/505 |
| 2003/0150290 A1 * | 8/2003 | Hanatani | ...................... | 74/501.6 |
| 2004/0200301 A1 * | 10/2004 | Amamiya et al. | .............. | 74/335 |
| 2005/0075773 A1 * | 4/2005 | Schweizer et al. | .............. | 701/51 |
| 2006/0041345 A1 * | 2/2006 | Metcalf | ........ | 701/33(Continued) |

FOREIGN PATENT DOCUMENTS

| | | |
|---|---|---|
| CN | 101162045A | 4/2008 |
| CN | 101169184A | 4/2008 |
| GB | 2459837A | 11/2009 |

OTHER PUBLICATIONS

Nuvinci 170S/N171B Continuously Variable Transmission Technical Manual Dec. 2008.*

(Continued)

*Primary Examiner* — Stefanos Karmis
*Assistant Examiner* — Michael E Butler
(74) *Attorney, Agent, or Firm* — Quinn Law Group, PLLC

(57) ABSTRACT

A transmission includes a controller that uses force feedback from a detent mechanism to determine appropriate actuator output for achieving a desired transmission range, which facilitates the implementation of "shift by wire" systems on pre-existing transmission designs.

11 Claims, 3 Drawing Sheets

(56) References Cited

U.S. PATENT DOCUMENTS

| | | | |
|---|---|---|---|
| 2008/0103665 A1* | 5/2008 | Kubonoya et al. | 701/59 |
| 2008/0113848 A1* | 5/2008 | Inoue et al. | 477/98 |
| 2008/0264190 A1* | 10/2008 | Nishimura | 74/335 |
| 2009/0038430 A1* | 2/2009 | Itazu et al. | 74/503 |
| 2010/0242655 A1* | 9/2010 | Ieda et al. | 74/473.1 |
| 2010/0294066 A1* | 11/2010 | Itazu et al. | 74/473.12 |
| 2010/0312424 A1* | 12/2010 | Yasui | 701/22 |
| 2012/0214628 A1* | 8/2012 | Johnson et al. | 474/80 |

OTHER PUBLICATIONS

Jtek Shiftmate Adapter Homepage, Mar. 2009.*
Shimano 7 Speed Transmission Hub User Mamual, Sep. 2004.*
Shimano Nexus 8 speed Technical Manual, Feb. 2006.*
Shimano Nexus 7 Enginering Manual pp. 11-12, Sep. 2004.*
Rohloff Shifter Service Manual Jun. 2014.*
Rohloff Mounting Manual, Jun. 2014.*
Rohloff Transmission Hub Service Manual Jun. 2014.*
Rohloff speedhub website Feb. 11, 2006.*

* cited by examiner

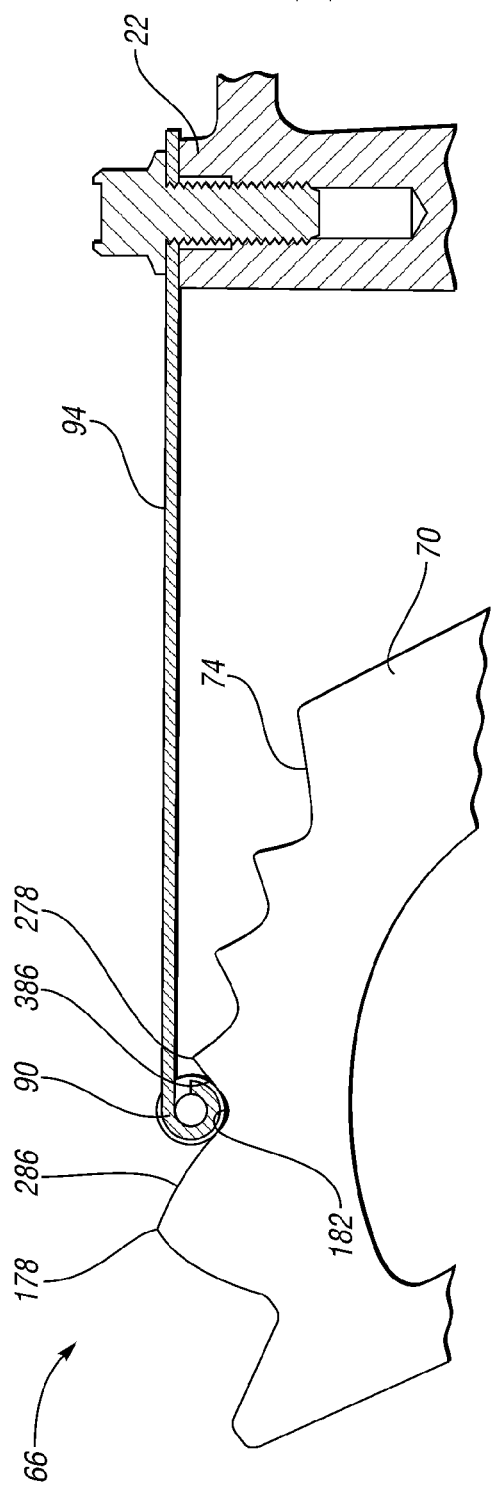

SELF ADJUSTING SHIFT CABLE ALIGNMENT FOR A TRANSMISSION RANGE CONTROL MODULE SYSTEM

CROSS-REFERENCE TO RELATED APPLICATION

This application claims the benefit of U.S. provisional patent application No. 61/320,851, filed Apr. 5, 2010, and which is hereby incorporated by reference in its entirety.

TECHNICAL FIELD

This invention relates to transmission range control modules.

BACKGROUND

Automatic, dual clutch and hybrid transmissions include an input member to receive torque from an engine or electric machines, an output member to transfer torque to a final drive system, and a geartrain with a plurality of clutches that are engageable in various combinations to provide a plurality of speed ratios between the input member and the output member. Automatic transmissions, dual clutch and hybrid transmissions have a plurality of driving ranges, which generally include Park, Reverse, Neutral, Drive, and Low, as understood by those skilled in the art. Some transmissions have a selectively rotatable shaft; the rotational position of the shaft determines which of the driving ranges is selected.

SUMMARY

A transmission is characterized by a plurality of driving ranges. The transmission includes a selectively movable range selection member characterized by a plurality of predetermined range selection member positions. Each of the predetermined range selection member positions corresponds to a respective one of the ranges. An actuator has a selectively movable output member, and is configured to selectively apply torque or force to the output member. A linkage operatively connects the output member to the range selection member such that movement of the output member causes movement of the range selection member, and such that the output member is characterized by a plurality of output member range positions. Each of the output member range positions corresponds to a respective one of the predetermined range selection member positions and a respective one of the ranges.

A detent mechanism is operatively connected to the range selection member and is configured to resist movement of the range selection member from each of the predetermined range selection member positions. A controller is operatively connected to the actuator, and is configured to use the resistance of the detent mechanism to determine the plurality of output member range positions.

The transmission provided faciliates the implementation of "shift by wire" systems on pre-existing transmission designs by using feedback from the detent mechanism to provide the controller with data regarding how to manipulate the actuator in order to achieve a desired transmission range.

A corresponding method is also provided. The method includes providing a transmission characterized by a plurality of driving ranges. The transmission includes a selectively movable range selection member characterized by a plurality of predetermined range selection member positions. Each of the predetermined range selection member positions corresponds to a respective one of the ranges.

The transmission also includes an actuator, a linkage, and a detent mechanism. The actuator has a selectively movable output member and is configured to selectively apply torque or force to the output member. The linkage operatively connects the output member to the range selection member such that movement of the output member causes movement of the range selection member, and such that the output member is characterized by a plurality of output member range positions. Each of the output member range positions corresponds to a respective one of the predetermined range selection member positions and a respective one of the ranges. The detent mechanism is operatively connected to the range selection member and is configured to resist movement of the range selection member from each of the predetermined range selection member positions. The method further includes determining the plurality of output member range positions by using the resistance of the detent mechanism.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic view of a detent mechanism operatively connected to the range control shaft of the transmission of FIG. 1.

DETAILED DESCRIPTION

Figure 1:
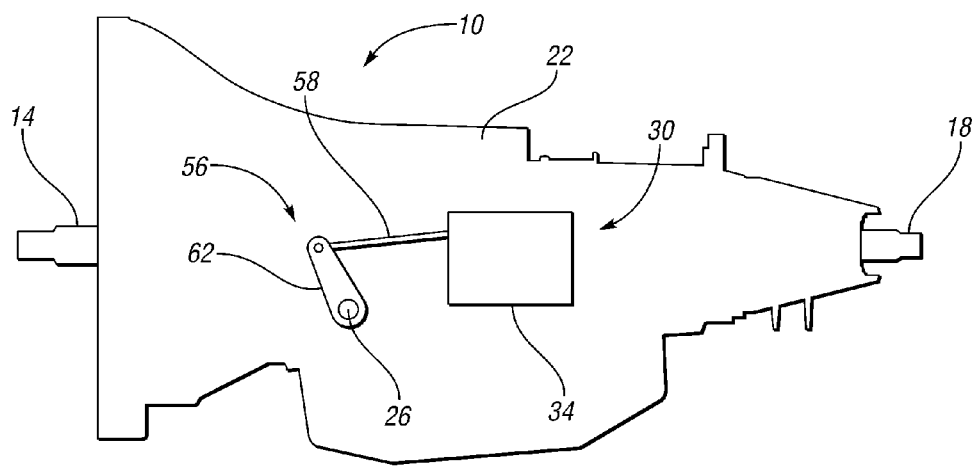
FIG. 1 is a schematic side view of a transmission system having a range control module.

Referring to FIG. 1, a transmission 10 includes an input member 14 and an output member 18. A plurality of planetary gear sets (not shown) and a plurality of selectively engageable clutches (not shown) are disposed within the housing 22 of the transmission 10. The planetary gear sets and the clutches are operable to provide a plurality of different speed ratios between the input member 14 and the output member 18, as understood by those skilled in the art. The input member 14 is operatively connectable to an engine to receive torque therefrom. The output member 18 is operatively connectable to the drive wheels (not shown) of a vehicle to deliver torque thereto. Hybrid transmissions may not include an input member 14 from an engine but will contain electric machines attached to the transmission or housed inside of the transmission to produce driving torque.

The transmission 10 is characterized by a plurality of transmission driving ranges, or modes. In the embodiment depicted, the transmission driving ranges include "Park," "Reverse," "Neutral," "Drive," and "Low." The transmission 10 is configured such that the position of a selectively movable range selection member (with respect to the housing 22) determines which of the driving ranges is selected. In the embodiment depicted, the transmission range selection member is a selectively rotatable shaft 26. More specifically, the shaft 26 is characterized by a plurality of predetermined range selection member positions; each of the predetermined range selection member positions corresponds to a respective one of the ranges. That is, each of the predetermined range selection member positions causes the transmission 10 to operate in a respective one of the driving ranges.

Accordingly, when the shaft 26 is in a first predetermined range selection member position, the transmission 10 is in the "Park" range; when the shaft 26 is in a second predetermined range selection member position, the transmission 10 in the "Reverse" range; when the shaft 26 is in a third predetermined range selection member position, the transmission 10 is in the "Neutral" range; when the shaft 26 is in a fourth predetermined range selection member position, the transmission 10 is in the "Drive" range; and when the shaft 26 is in a fifth predetermined range selection member position, the transmission 10 is in the "Low" range. In the embodiment depicted, the predetermined range selection member positions are rotary positions.

Figure 2:
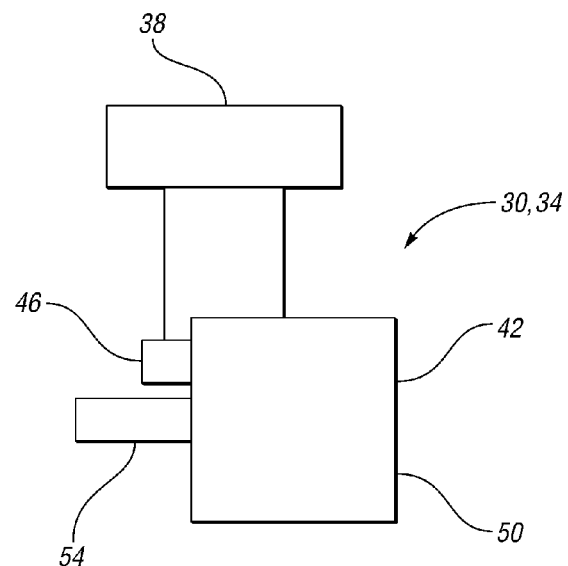
FIG. 2 is a schematic view of the range control module of FIG. 1.

A shift-by-wire system 30 includes a range control module (RCM) 34 mounted with respect to the housing 22. The RCM 34 is configured to cause the transmission 10 to enter the transmission driving range desired by a driver of the vehicle by moving the shaft 26 to the predetermined range selection member position that corresponds to the desired range. More specifically, and with reference to FIG. 2, the RCM 34 includes an electronic controller 38, an actuator 42, and a resolver 46. The actuator 42 has a selectively movable output member, and is configured to selectively apply force or torque to the output member. In the embodiment depicted, the actuator 42 is an electric motor having a stator 50 and a rotor 54. The rotor 54 is the output member. The resolver 46 is a sensor that is configured to measure the rotational position of the rotor 54 and the rotational velocity of the rotor 54 with respect to the stator 50.

The motor 42 is operatively connected to the shaft 26 and is configured to selectively rotate the shaft 26, thereby to change the selected transmission range. More specifically, and with reference to FIGS. 1 and 2, a linkage 56 operatively connects the rotor 54 to the shaft 26 such that movement of the rotor 54 causes movement of the shaft 26, and such that the rotor 54 is characterized by a plurality of output member range positions. Each of the output member range positions corresponds to a respective one of the predetermined range selection member positions and a respective one of the ranges.

That is, the linkage operatively connects the rotor 54 to the shaft 26 such that the position of the rotor 54 determines the transmission range selected. Thus, each of the output member range positions of the rotor 54 causes the transmission 10 to operate in a respective one of the driving ranges. The linkage 56 in the embodiment depicted includes a shift cable 58 and an arm 62. The rotor 54 of the motor 42 is operatively connected to the shift cable 58, which in turn is connected to the shaft 26 by the arm 62. Rotation of the rotor 54 thereby causes rotation of the shaft 26. It should be noted that output member range positions may be measured from a reference position of the rotor 54 with respect to the stator 50, and may cover a range that is greater than 360 degrees.

It should be noted that the transmission 10, RCM 34, and linkage 56 are shown schematically, and thus the relative sizes and positions of the transmission, cable 58, and RCM 30 may or may not vary considerably from what is shown in FIG. 1. For example, it may be desirable in some circumstances to position the RCM 34 farther from the shaft 26 than what is shown, depending upon packaging considerations, etc. Furthermore, it should be noted that, although the linkage 56 between the RCM 34 and the shaft 26 includes a flexible cable 58 in the embodiment depicted, other linkages may also be employed within the scope of the claimed invention. For example, cable 58 may be replaced by one or more rigid linkages pivotably connected to one another.

The controller 38 is operatively connected to controls (not shown) in the passenger compartment (not shown) of the vehicle. The controls are configured to generate electronic signals in response to manipulation by a driver of the vehicle. The electronic signals generated by the controls are indicative of the driver's desired transmission range. The controls transmit the electronic signals indicative of the driver's desired transmission range to the controller 38. The controller 38 is operatively connected to the actuator 42 and is configured to cause the actuator 42 to move the shaft 26 to the position corresponding to the desired transmission range in response to the signals indicative of the driver's desired transmission range.

Figure 3:
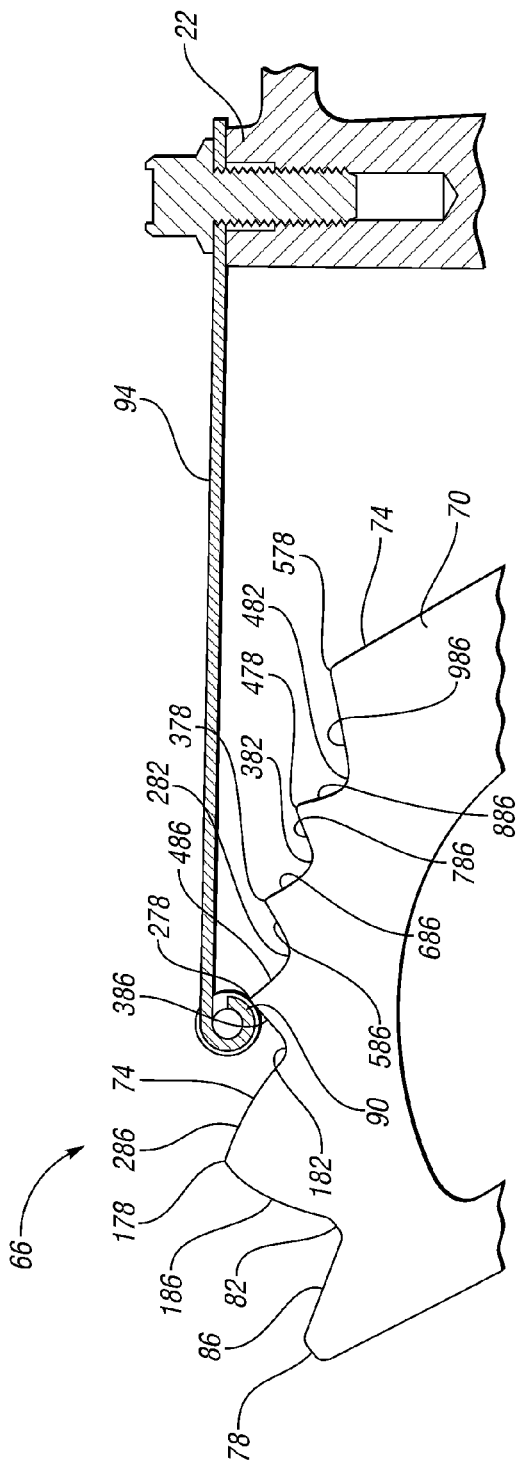
FIG. 3 is a schematic view of a detent mechanism operatively connected to the range control shaft of the transmission of FIG. 1.

Referring to FIG. 3, a detent mechanism 66 is operatively connected to the shaft 26 and is configured to resist movement of the shaft 26 from each of the predetermined range selection member positions. More specifically, the detent mechanism 66 includes a first detent member 70 operatively connected to the shaft 26 for rotation therewith. The first detent member 70 defines surface 74, which is characterized by peaks 78, 178, 278, 378, 478, 578; valleys 82, 182, 282, 382, 482; and ramps 86, 186, 286, 386, 486, 586, 686, 786, 886, 986. Ramp 86 interconnects peak 78 and valley 82. Ramp 186 interconnects valley 82 and peak 178. Ramp 286 interconnects peak 178 and valley 182. Ramp 386 interconnects valley 182 and peak 278. Ramp 486 interconnects peak 278 and valley 282. Ramp 586 interconnects valley 282 and peak 378. Ramp 686 interconnects peak 378 and valley 382. Ramp 786 interconnects valley 382 and peak 478. Ramp 886 interconnects peak 478 and valley 482. Ramp 986 interconnects valley 482 and peak 578.

The detent mechanism 66 also includes a second detent member 90 that contacts surface 74. A spring 94 is mounted with respect to the transmission housing 22 and biases the second detent member 90 against surface 74. In the embodiment depicted, member 90 is part of the spring 94. Accordingly, as the shaft 26 and the first detent member 70 rotate, the second detent member 90 traverses the peaks, valleys, and ramps of surface 74. The detent mechanism 66 and the transmission 10 are configured such that the second detent member 90 contacts one of the valleys 82, 182, 282, 382, 482 when the shaft 26 is in one of the predetermined range selection member positions. More specifically, the transmission is in the "Park" range when the member 90 contacts valley 82, the transmission is in the "Reverse" range when the member 90 contacts valley 182, the transmission is in the "Neutral" range when the member 90 contacts valley 282, the transmission is in the "Drive" range when the member 90 contacts valley 382, and the transmission is in the "Low" range when the member 90 contacts valley 482.

When the second member 90 contacts any of the valleys 82, 182, 282, 382, 482, rotation of the shaft 26 causes the second member 90 to ascend one of the ramps 86, 186, 286, 386, 486, 586, 686, 786, 886, 986, which causes elastic deformation of the spring 94; accordingly, the spring 94 resists rotation of the shaft 26 from each of the predetermined range selection member positions.

Since the rotor 54 of the motor 42 is operatively connected to the shaft 26 via the shift cable 58 and arm 62, the rotational position of the rotor 54 determines the rotational position of the shaft 26. Accordingly, each of the transmission ranges corresponds to a respective rotational position of the rotor 54

(i.e., the output member range positions). The controller 38 is configured to use the resistance of the detent mechanism 66 to determine the plurality of output member range positions.

More specifically, the controller 38 is configured to perform a method whereby the controller 38 determines and/or confirms which positions of the rotor 54 correspond to the transmission ranges based on the resistance to movement of the rotor 54 applied by the detent mechanism 66. As used herein, "determining" the plurality of output member range positions includes confirming that a prerecorded set of output member range positions are accurate.

In a first embodiment, the method performed by the controller 38 includes causing the output member, i.e., the rotor 54, to move. In the embodiment depicted, the controller 38 causes the rotor 54 to move by controlling the actuator 42 such that the actuator 42 applies torque to the rotor 54. Causing the rotor 54 to move results in movement of the cable 58, which in turn causes the shaft 26 and the first detent member 70 to rotate. As the shaft 26 rotates through all of the possible transmission range locations, i.e., the predetermined range selection member positions, the second member 90 traverses surface 74, including all of the valleys 82, 182, 282, 382, 482. The method also includes monitoring the rotational position of the rotor 54 (using the resolver 46) and the force or torque applied by the actuator 42 (using, for example, back electromotive force) while causing the rotor 54 to move.

The method performed by the controller also includes recording the positions of the output member, i.e., the rotor 54, at which the amount of torque or force applied by the actuator 42 increases or changes direction. The torque that must be supplied by the motor 42 to rotate the shaft 26 varies with the rotational position of the shaft 26 due to the detent spring 94. More specifically, when the second detent member 90 is in any one of the valleys 82, 182, 282, 382, 482, rotation of the shaft 26 in either direction causes elastic strain of the spring 94, and thus more torque is required from the motor 42 to rotate the shaft 26. When the member 90 is on any one of the peaks, rotation of the shaft in either direction results in energy stored by the spring 94 assisting the rotation of the shaft 26, thereby requiring less torque from the motor 42.

Figure 4:
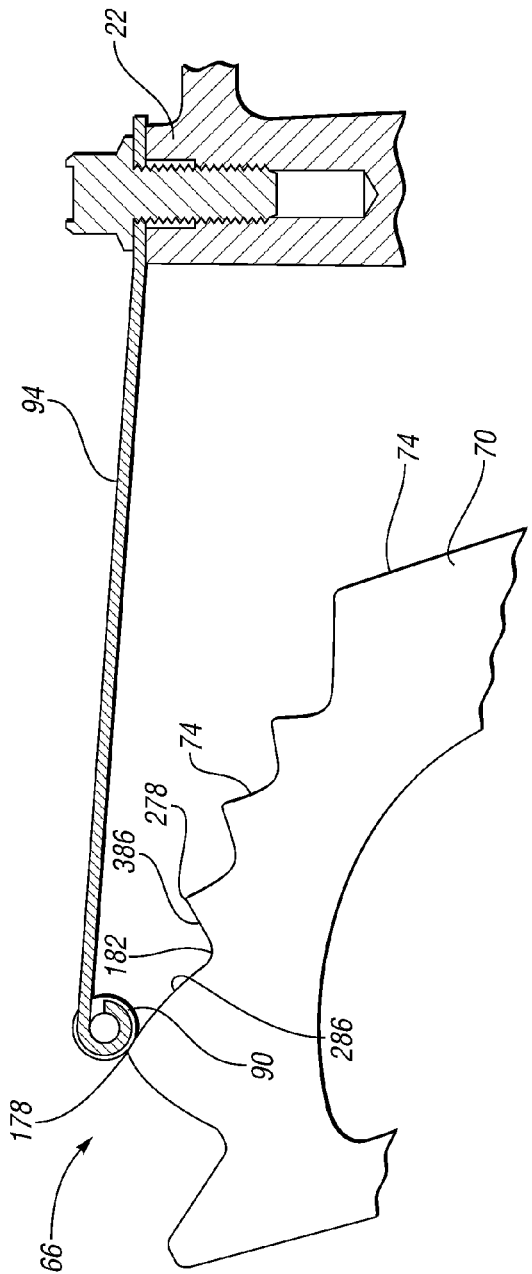
FIG. 4 is another schematic view of a detent mechanism operatively connected to the range control shaft of the transmission of FIG. 1.

Thus, and with reference to FIG. 4, the shaft 26 is between the "Park" position and the "Reverse" position, with the member 90 on ramp 286 adjacent peak 178. The detent spring 94 exerts a force on the ramp 286 that urges the shaft 26 toward the Reverse position. Accordingly, movement of the shaft 26 from the position indicated in FIG. 4 to the position indicated in FIG. 5 requires less torque from the motor 42 than movement of the shaft 26 from the position indicated in FIG. 5 to the position indicated in FIG. 4. The shaft 26 is in the Reverse position when the detent member 70 is in the position shown in FIG. 5.

Similarly, and with reference to FIG. 3, the shaft 26 is between the "Reverse" position and the "Neutral" position, with the member 90 on ramp 386 adjacent peak 278. The detent spring 94 exerts a force on the ramp 386 that urges the shaft 26 toward the Reverse position. Accordingly, movement of the shaft 26 from the position indicated in FIG. 3 to the position indicated in FIG. 5 requires less torque from the motor 42 than movement of the shaft from the position indicated in FIG. 5 to the position indicated in FIG. 3.

Thus, the controller 38 can determine which rotational position of the rotor 54 corresponds to the "Reverse" position of the shaft 26 (when member 90 is at valley 182) by determining the position of the rotor 54 when the applied torque changes. The controller 38 may cause the shaft 26 to rotate so that the member 90 traverses ramps 286 and 386 several times, taking average values to calculate the "Reverse" position. The controller 38 then repeats these steps for each of the other transmission range positions to determine the rotor 54 positions that correspond to "Park," "Neutral," "Drive,' and "Low." The controller 38 records the rotor positions that correspond to each of the transmission ranges for future use, i.e., when the controller 38 receives a signal to move the transmission to one of the ranges.

That is, the predetermined range selection member positions will be approximately where the force or torque applied by the actuator 42 changes direction, i.e. where the actuator goes from holding the detent back to pushing against the detent. In order to account for hysteresis in the park system, the method may also include rotating the shaft 26 in a first direction and then rotating the shaft 26 in a second direction, and for each range, monitoring the two shaft positions at which a torque or force reversal occurs. The method would then further include interpolating between the two shaft positions at which a torque or force reversal occurs to determine the nominal predetermined range selection member position. Recording positions of the output member at which the amount of torque or force applied by the actuator increases or changes direction may include recording average positions or interpolated positions within the scope of the claimed invention.

The controller 38 may instead be configured to perform an alternative method whereby the controller 38 determines and/or confirms which positions of the rotor 54 correspond to the transmission ranges. The alternative method includes causing the output member, i.e., the rotor 54, to move to preselected output member positions, and subsequently allowing the output member to move freely from each of the preselected output member positions to a respective one of the output member range positions. In other words, the controller causes the motor 42 to move the cable 58 a specified amount so that the shaft 26 moves to a predicted range location, and then lets the motor 42 go into a "torque free" mode in which the force of the detent spring 94 will move the shaft 26 any remaining distance to the proper shaft location, i.e., one of the predetermined range selection member positions. The detent spring 94 will "back" drive the free-wheeling rotor 54 to the correct position. Once this happens, the controller 38 will record the rotor 54 location as the correct location for that requested range. The process is repeated for each range location.

Thus, for example, the controller 38 has a stored rotor position that corresponds to the "Reverse" range. To determine the accuracy of the stored rotor position, the controller 38 commands the motor 42 to move the rotor 54 to the stored rotor position that corresponds to the "Reverse" range, i.e., the position that is predicted to result in the shaft 26 being in the "Reverse" position. If the commanded position of the rotor 54 is inaccurate and results in the shaft 26 being in either of the positions indicated in FIGS. 3 and 4, then the spring 94 will move the shaft 26 to the "Reverse" position shown in FIG. 5 once the controller 38 permits the rotor 54 to "freewheel." The controller 38 then records the position of the rotor 54 when the shaft 26 is in the position indicated by FIG. 5 as a corrected "Reverse" position. The controller 38 repeats these steps for each of the other transmission ranges (Park, Neutral, Drive, and Low), and stores the rotor 54 positions that result in those ranges. Accordingly, when a vehicle driver transmits a signal to the controller 38 that a particular range is desired, the controller 38 causes the rotor 54 to move to the corrected position corresponding to the desired transmission range.

The methods employed by the controller 38 may be performed during transmission assembly and/or at various times during the service life of the automobile. The methods allow implementation of shift by wire technology on automatic, dual clutch and hybrid transmissions without extensive transmission hardware and software redesign to existing transmission systems and related shifter cables. The methods also eliminate manual adjustment of shifter cables in vehicle assembly plant and provide end of line testing capability to verify operation.

The actuator in the embodiment depicted is a motor 42, and the output member of the actuator is the rotor 54. However, other actuators may be employed within the scope of the claimed invention. For example, the actuator may be a solenoid or other actuator having an output member with linear movement. In such an embodiment, a sensor configured to monitor the linear displacement of the output member would replace the resolver, and the controller 38 would monitor force applied by the actuator instead of torque.

While the best modes for carrying out the invention have been described in detail, those familiar with the art to which this invention relates will recognize various alternative designs and embodiments for practicing the invention within the scope of the appended claims.

The invention claimed is:

1. A transmission characterized by a plurality of driving ranges, comprising:
   a selectively movable range selection member characterized by a plurality of predetermined range selection member positions, each of said predetermined range selection member positions corresponding to a respective one of the ranges;
   wherein the range selection member is a selectively rotatable shaft;
   an actuator having a selectively movable output member, and being configured to selectively apply torque or force to the output member;
   wherein the actuator is an electric motor;
   wherein the output member is a selectively rotatable rotor;
   a linkage operatively connecting the output member to the range selection member such that movement of the output member causes movement of the range selection member, and such that the output member is characterized by a plurality of output member range positions, each of the output member range positions corresponding to a respective one of the predetermined range selection member positions and a respective one of the ranges;
   a detent mechanism operatively connected to the range selection member and configured to resist movement of the range selection member from each of the predetermined range selection member positions; and
   a controller configured to use the resistance of the detent mechanism to determine the plurality of output member range positions;
   wherein the controller is configured to determine the plurality of output member range positions by:
      monitoring the torque or force applied by the actuator during movement of the output member;
      actuating the output member to move through a plurality of positions of the output member at which the amount of torque or force applied by the actuator changes direction;
      wherein movement of the output member through the plurality of positions is continuously actuated by the controller; and
      recording the plurality of positions of the output member at which the amount of torque or force applied by the actuator changes direction;
   wherein each of the output member range positions corresponds to a respective one of the plurality positions of the output member at which the amount of torque or force applied by the actuator changes direction.

2. The transmission of claim 1, wherein the detent mechanism includes a first detent member mounted with respect to the range selection member for movement therewith, said first detent member defining a surface characterized by a plurality of peaks and valleys;
   a second detent member contacting the surface; and
   a spring biasing the second detent member against the surface;
   wherein the detent mechanism is configured such that the second detent member contacts one of the valleys when the range selection member is in one of the predetermined range selection member positions.

3. The transmission of claim 2, wherein:
   each of the valleys is defined by opposing first and second ramps;
   the amount of torque or force applied by the actuator changes direction when the second detent member traverses between the first ramp and the second ramp; and
   the controller is configured to:
      actuate the output member to cause the second detent member to traverse between the first and second ramps of at least one of the valleys a plurality of times;
      detect the change in the amount of torque or force applied by the actuator for each of the plurality of times;
      determine a corresponding position of the output member at the time the amount of torque or force changes direction for each of the plurality of times to define a plurality of corresponding positions; and
      average the plurality of corresponding positions to determine the output member range position which corresponds predetermined range selection member position defined by the at least one valley.

4. The transmission of claim 1, wherein the controller is configured to determine the plurality of output member range positions by causing the output member to move to preselected output member positions and allowing the output member to move freely from each of the preselected output member positions to a respective one of the output member range positions.

5. The transmission of claim 4, wherein the controller is configured to record the output member range positions after the output member moves freely from the preselected output member positions.

6. The transmission of claim 1, wherein the linkage includes a cable operatively connected to the rotor and to the shaft.

7. A method comprising:
   providing a transmission characterized by a plurality of driving ranges, the transmission including:
      a selectively movable range selection member characterized by a plurality of predetermined range selection member positions, each of said predetermined range selection member positions corresponding to a respective one of the ranges;
      wherein the range selection member is a selectively rotatable shaft;
      an actuator having a selectively movable output member and being configured to selectively apply torque or force to the output member;
      wherein the actuator is an electric motor;

wherein the output member is a selectively rotatable rotor;

a linkage operatively connecting the output member to the range selection member such that movement of the output member causes movement of the range selection member, and such that the output member is characterized by a plurality of output member range positions, each of the output member range positions corresponding to a respective one of the predetermined range selection member positions and a respective one of the ranges;

a detent mechanism operatively connected to the range selection member and configured to resist movement of the range selection member from each of the predetermined range selection member positions;

a controller configured to use the resistance of the detent mechanism to determine the plurality of output member range positions;

determining, via the controller, the plurality of output member range positions by using the resistance of the detent mechanism, by:

monitoring the torque or force applied by the actuator during movement of the output member;

actuating the output member to move through a plurality of positions of the output member at which the amount of torque or force applied by the actuator changes direction;

wherein movement of the output member through the plurality of positions is continuously actuated by the controller; and recording the plurality of positions of the output member at which the amount of torque or force applied by the actuator changes direction;

wherein each of the output member range positions corresponds to a respective one of the plurality positions of the output member at which the amount of torque or force applied by the actuator changes direction.

8. The method of claim 7, wherein said determining the plurality of output member range positions includes causing the output member to move to preselected output member positions and allowing the output member to move freely from each of the preselected output member positions to a respective one of the output member range positions.

9. The method of claim 8, further comprising recording the output member range positions after the output member moves freely from the preselected output member positions.

10. The method of claim 7, wherein the linkage includes a cable operatively connected to the rotor and to the shaft.

11. The method of claim 7, wherein the detent mechanism includes a first detent member mounted with respect to the range selection member for movement therewith, said first detent member defining a surface characterized by a plurality of peaks and valleys;

a second detent member contacting the surface; and a spring biasing the second detent member against the surface;

wherein the detent mechanism is configured such that the second detent member contacts one of the valleys when the range selection member is in one of the predetermined range selection member positions;

each of the valleys is defined by opposing first and second ramps;

the amount of torque or force applied by the actuator changes direction when the second detent member traverses between the first ramp and the second ramp;

the method further comprising:

actuating, via the controller, the output member to cause the second detent member to traverse between the first and second ramps of at least one of the valleys a plurality of times;

detecting the change in the amount of torque or force applied by the actuator for each of the plurality of times;

determining a corresponding position of the output member at the time the amount of torque or force changes direction for each of the plurality of times to define a plurality of corresponding positions; and averaging the plurality of corresponding positions to determine the output member range position which corresponds predetermined range selection member position defined by the at least one valley.

* * * * *